United States Patent Office 3,336,188
Patented Aug. 15, 1967

3,336,188
PHOSPHORUS CONTAINING PESTICIDAL
COMPOSITION AND METHOD OF USE
Henry Tolkmith and Herman O. Senkbeil, Midland, Mich., assignors to The Dow Chemical Company, Midland, Mich., a corporation of Delaware
No Drawing. Filed Jan. 6, 1964, Ser. No. 336,035
23 Claims. (Cl. 167—33)

The present invention consist of phosphorus compounds of the formula

and of methods and compositions employing phosphorus compounds for the control of fungal organisms. In this and succeeding formulae, Z represents oxygen or sulfur; each R independently represents loweralkylamino, alkoxy, alkylthio, alkyl, phenyl, substituted phenyl, phenoxy, or substituted phenoxy, each of the substituted phenyl and substituted phenoxy radicals being independently substituted by from 1 to 3, both inclusive, substituents, each of which substituents is independently selected from the group consisting of halo and loweralkyl; R' represents R or amino; and R" represents a cyclic dicarboximido radical. These novel compounds are oils or crystalline solid materials which are somewhat soluble in many common organic solvents and of very low solubility in water. They are useful as parasiticides for the control of a wide variety of insect, mite, helminth, plant, fungal, and bacterial organisms.

In the present specification and claims, the terms "loweralkyl" and "loweralkoxy" are employed to refer to radicals being of from 1 to 4, inclusive, carbon atoms, and the terms "alkyl," alkoxy" and "alkylthio" are employed to refer to radicals being of from 1 to 12, inclusive, carbon atoms. Representative radicals include methyl, ethyl, isopropyl, sec-butyl, isopentyl, hexyl, 2-ethylpentyl, decyl, undecyl, dodecyl, 3-methylnonyl, methoxy, n-propoxy, sec-pentyloxy, heptyloxy, 2-ethylhexyloxy, dodecyloxy, and the like. The term "loweralkylamino" is employed in the present specification and claims to refer to an amino radical substituted with one or two loweralkyl groups. The term "halo" is employed in the present specification and claims to designate bromo or chloro.

The term "cyclic dicarboximido radical" is employed in the present specification and claims to refer to succinimido, dichloromaleimido, cyclic hydrocarbon ortho-dicarboximido, and substituted cyclic hydrocarbon ortho-dicarboximido bearing one or more substituent moieties selected from the group consisting of halo, nitro, loweralkyl, methoxy, loweralkoxycarbonyl, and acetamido, there being halo as sole substituent moiety in the number of from 1 to 4, both inclusive, and other substituent moiety in the number of from 1 to 2, both inclusive. The term "cyclic hydrocarbon ortho-dicarboximido" is employed in the present specification and claims to refer to phthalimido, partially-saturated phthalimido, cyclohexane-1,2-dicarboximido; norbornane-2,3-dicarboximido; 5-norbornene-2,3-dicarboximido; 7-oxabicyclo(2.2.1)heptane-2,3-dicarboximido; and 7-oxabicyclo(2.2.1)hept-5-ene-2,3-dicarboximido. Representative partially-saturated phthalimido radicals include 4-cyclohexene-1,2-dicarboximido, 1-cyclohexene-1,2-dicarboximido, 1,4-cyclohexadiene-1,2-dicarboximido, 3,5-cyclohexadiene-1,2-dicarboximido, 3-cyclohexene-1,2-dicarboximido, and 2,6-cyclohexadiene-1,2-dicarboximido.

Representative substituted cyclic hydrocarbon ortho-dicarboximido radicals include
3,6-dimethyl-4-cyclohexene-1,2-dicarboximido,
tetrachlorophthalimido,
x-methyl-5-norbornene-2,3-dicarboximido,
tetrabromophthalimido,
4-bromophthalimido,
3-bromo-4-methylphthalimido,
5-methoxynorbornane-2,3-dicarboximido,
4,5-dichlorophthalimido,
4-bromo-5-chlorophthalimido,
5,6-dimethyl-7-oxabicyclo(2.2.1)heptane-2,3-dicarboximido,
4-methyl-phthalimido,
3-nitrophthalimido,
4-methoxyphthalimido,
4-n-butylphthalimido,
3-ethyl-4-cyclohexene-1,2-dicarboximido-4-methyl-4-cyclohexene-1,2-dicarboximido,
3-n-propyl-1-cyclohexene-1,2-dicarboximido,
4-nitro-6-acetamidocyclohexane-1,2-dicarboximido,
4-(n-propoxycarbonyl)cyclohexane-1,2-dicarboximido,
4-methyl-6-acetamidophthalimido,
4,5-dichloro-4-cyclohexene-1,2-dicarboximido,
5-nitro-7-oxabicyclo(2.2.1)hept-5-ene-2,3-dicarboximido,
and the like.

A preferred embodiment of the present invention consists of compounds of the following formulae:

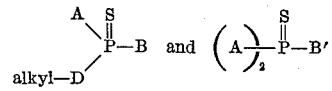

wherein A represents a member selected from the group consisting of alkoxy, alkylthio, and loweralkylamino; D represents a member selected from the group consisting of oxygen and sulfur; B represents a member selected from the group consisting of partially-saturated phthalimido, cyclohexane-1,2-dicarboximido, loweralkyl-substituted partially-saturated phthalimido, and loweralkyl-substituted cyclohexane-1,2-dicarboximido; and B' represents a member selected from the group consisting of halo-substituted partially-saturated phthalimido, phthalimido, and substituted phthalimido bearing at least one substituent moiety selected from the group consisting of loweralkyl, halo, and nitro, there being halo as sole substituent moiety in the number of from 1 to 4, both inclusive, and other substituent moiety in the number of from 1 to 2, both inclusive. These compounds possess an excellent combination of the various properties of the present phosphorus compounds and are excellently suited to be employed for the control of fungal organisms.

In the present specification and claims, each of the terms "loweralkyl-substituted partially-saturated phthalimido" and "loweralkyl-substituted cyclohexane-1,2-dicarboximido" is employed to refer to a radical having one or two loweralkyl substituent groups thereon; representative such radicals include 3-ethyl-4-cyclohexene-1,2-dicarboximido, 4-methyl-1-cyclohexene-1,2-dicarboximido, 4-isopropylcyclohexane-1,2-dicarboximido, 3 - butyl - 3,5-cyclohexadiene-1,2-dicarboximido, and the like. The term "halo-substituted partially-saturated phthalimido" is employed in the present specification and claims to refer to a radical having from 1 to 4, both inclusive, halo substituents, wherein each halo substituent is bonded to a vinylene carbon atom, i.e., a carbon atom doubly bonded to another carbon atom of the partially-saturated phthalimido ring. Representative such radicals include 3,4,5,6-tetrachloro-3,5-cyclohexadiene - 1,2 - dicarboximido, 4-bromo-4-cyclohexene-1,2-dicarboximido, 4,5-dichloro-4-cyclohexene - 1,2-dicarboximido; 4-chloro-4-cyclohexene-1,2-dicarboximido, and the like.

Another preferred embodiment of the present invention consists of the compounds of the formula:

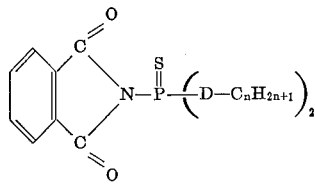

wherein each D is hereinbefore defined and $n$ represents an integer of from 1 to 6, inclusive. These compounds, in addition to possessing the parasiticidal utility, in particular the fungicidal utility, admit of ready preparaton and exhibit low mammalian toxicity.

The compounds of the present inventions are prepared by reacting an N-alkali metal derivative of a cyclic dicarboximido compound, which derivative has the formula:

$$\text{alkali metal—R''}$$

with a phosphoric or phosphorothioic chloride of the formula:

The reaction is conveniently carried out in the presence of an inert reaction medium, preferably an organic liquid such as N-methyl - 2 - pyrrolidone, dimethylformamide, hexamethylphosphoramide, N-acetylmorpholine, and dimethylacetamide. The amounts of the reactants to be employed are not critical, some of the desired product compound being obtained when employing the reactants in any amounts. However, the reaction consumes the reactants in equimolecular proportions and the use of amounts which represent such proportions is preferred. The reaction takes place smoothly at temperatures between −20° and 80° C., and preferably at temperatures between 0° and 40°, with the production of the desired product and the chloride salt of the alkali metal.

In carrying out the reaction, the reactants are contacted together in any convenient fashion and maintained for a period of time in the reaction temperature range to complete the reaction. Some of the desired product is formed immediately upon the contacting together of the reactants; however, the yield of the desired product is increased by permitting the reaction mixture to stand for a period of time. Following the completion of the reaction, the reaction mixture can be employed for the useful purposes of the present inventions; also, the desired product compound can be separated from the reaction mixture by distillation or evaporation of the solvent under reduced pressure or, in the case of solvents miscible with water, by the addition of water which renders the product insoluble. As a result of such operations, the desired product compound is obtained as a residue. This residue can be used without purification or can be purified by conventional procedures such as, for example, washing with water, washing with inert liquid reaction medium, or recrystallization.

The following examples illustrate the invention but are not to be construed as limiting.

EXAMPLE 1

*O,O-diethyl phthalimidophosphonothioate*

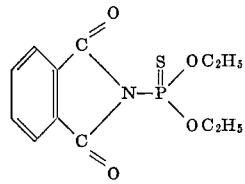

O,O-diethyl phosphorochloridothioate (18.9 grams; 0.1 mole) was added portionwise with stirring to 18.5 grams of potassium phthalimide (0.1 mole) dispersed in 175 milliliters of N-methyl-2-pyrrolidone. The addition was carried out at a temperature of 0°–2° C. A 25 milliliter portion of N-methyl-2-pyrrolidone was added to the reaction mixture; thereafter, the mixture was set aside for a period of about 16 hours at 0°–2° C., with stirring, to insure completion of the reaction. The reaction mixture was then diluted with water to remove alkali metal chloride of reaction and precipitate the product, and filtered to obtain the O,O-diethyl phthalimidophosphonothioate compound as a crystalline residue. The residue was dried, recrystallized from hexane, and found to melt at 81.5°–83.5° C. Upon oral administration to male rats, this product has an LD/50 of 5600 milligrams per kilogram of body weight.

In a similar manner, other products of the present inventions are prepared as follows:

O,O - di-n-butyl phthalimidophosphonothioate (molecular weight of 355.4; refractive index $n$ measured at 25° C. for the D line of sodium light of 1.5340) by reacting together the N-sodium derivative of phthalimide with O,O-di-n-butyl phosphorochloridothioate.

O,O - di - n - hexyl phthalimidophosphonate (molecular weight of 395.4) by reacting together the N-potassium derivative of phthalimide with O,O-di-n-hexyl phosphorochloridate.

S,S-di-n-undecyl (3,6-dimethyl-4-cyclohexene-1,2-dicarboximido)phosphonotrithioate (molecular weight of 616.0) by reacting together the N-sodium derivative of 3,6-dimethyl-4-cyclohexene-1,2-dicarboximide with S,S-di-n-undecyl phosphorochloridotrithioate.

O-ethyl N,N-diethyl(4-cyclohexene-1,2-dicarboximido) phosphonamidothioate (having a refractive index $n$ measured at 25° C. for the D line of sodium light of 1.5210) by reacting together the N-potassium derivative of 4-cyclohexene-1,2-dicarboximide with O-ethyl N,N-diethyl-phosphoramidochloridothioate.

O,O-dimethyl phthalimidophosphonothioate (melting at 126.5°–128° C.; actual nitrogen content of 5.14 percent compared to a theoretical nitrogen content of 5.16 percent) by reacting together the N-sodium derivative of phthalimide with O,O-dimethyl phosphorochloridothioate.

Dimethylphthalimidophosphine sulfide (molecular weight of 239.2) by reacting together the N-potassium derivative of phthalimide with dimethylphosphinothioic chloride.

O-ethyl O-methyl phthalimidophosphonothioate (molecular weight of 285.3) by reacting together the N-potassium derivative of phthalimide with O-ethyl O-methyl phosphorochloridothioate.

N,N,N',N'-tetramethylphthalimidophosphonothioic diamide (melting at 170–171.5° C.) by reacting together the N-potassium derivative of phthalimide with N,N,N', N'-tetramethylphosphorodiamidothioic chloride.

O-ethyl ethyl(4,5-dibromophthalimido)phosphinothioate (molecular weight of 352.2) by reacting together the N-sodium derivative of 4,5-dibromophthalimide with O-ethyl ethylphosphonochloridothioate.

O - ethyl O - n - propyl phthalimidophosphonothioate (molecular weight of 313.3) by reacting together the N-sodium derivative of phthalimide with O-ethyl O-n-propyl phosphorochloridothioate.

O-ethyl N-n-butylphthalimidophosphonamidate (molecular weight of 310.3) by reacting together the N-potassium derivative of phthalimide with O-ethyl N-n-butyl-phosphoramidochloridate.

N,N-dimethyl-P-methyl-P-(4 - cyclohexene - 1,2-dicarboximido)phosphinic amide (molecular weight of 256.2) by reacting together the N-potassium derivative of 4-cyclohexene-1,2 - dicarboximide with N,N - dimethyl-P-methyl-phosphonochloridate.

O,O-diethyl (3,4,5,6-tetrachlorophthalimido)phosphonate (melting at 144–145° C.) by reacting together the N-sodium derivative of 3,4,5,6-tetrachlorophthalimide with O,O-diethyl phosphorochloridate.

N'-ethyl-N,N-di-n-propyl(4 - cyclohexene - 1,2 - dicarboximido)phosphonothioic diamide (molecular weight of 355.4) by reacting together the N-sodium derivative of 4-cyclohexene-1,2-dicarboximide with N'-ethyl-N,N-di-n-propylphosphorodiamidothioic chloride.

S-ethyl methyl(3,5 - cyclohexadiene-1,2-dicarboximido) phosphinodithioate (molecular weight of 287.3) by reacting together the N-sodium derivtive of 3,5-cyclohexadiene-1,2-dicarboximide with S-ethyl methylphosphonochloridothioate.

O,O-dimethyl (4-cyclohexene-1,2-dicarboximido)phosphonothioate (molecular weight of 275.3) by reacting together the N-potassium derivative of 4-cyclohexene-1,2-dicarboximide with O,O - dimethyl phosphorochloridothioate.

O-ethyl N,N-dimethylphthalimidophosphonamidothioate (melting at 83–84° C.) by reacting together the N-potassium derivative of phthalimide with O-ethyl N,N-dimethylphosphoramidochloridothioate.

Bis(2-ethylhexyl)phthalimidophosphine oxide (molecular weight of 419.6) by reacting together the N-potassium derivative of phthalimide with bis(2-ethylhexyl) phosphinic chloride.

O,O-di - n - propyl (4-cyclohexene-1,2-dicarboximido)-phosphonothioate (molecular weight of 331.4) by reacting together the N-sodium derivative of 4-cyclohexene-1,2-dicarboximide with O,O-di-n-propyl phosphorochloridothioate.

O,O - diethyl (4 - bromophthalimido)phosphonothioate (melting at 69–70° C.) by reacting together the N-potassium derivative of 4-bromo-phthalimide with O,O-diethyl phosphorochloridothioate. The product has the following elemental analysis:

| Element | Percent Found | Theoretical |
| --- | --- | --- |
| Bromine | 21.30 | 21.15 |
| Nitrogen | 3.69 | 3.70 |

O-isopropyl N-methyl(4-bromo-5-methylphthalimido)-phosphonamidothioate (molecular weight of 391.2) by reacting together the N-sodium derivative of 4-bromo-5-methylphthalimide with O-isopropyl N-methylphosphoramidochloridothioate.

S,S-bis(2-ethylpentyl) succinimidophosphonotrithioate (molecular weight of 423.6) by reacting together the N-sodium derivative of succinimide with S,S-bis(2-ethylpentyl) phosphorochloridotrithioate.

O-ethyl O-n-propyl (4-cyclohexene-1,2-dicarboximido) phosphonothioate (molecular weight of 317.4) by reacting together the N-sodium derivative of 4-cyclohexene-1,2-dicarboximide with O-ethyl O-n-propyl phosphorochloridothioate.

O,O-diethyl (4-cyclohexene-1,2-dicarboximido)-phosphonothioate (having a refractive index $n$ measured at 25° C. for the D line of sodium light of 1.5205 and an actual nitrogen content of 4.78 percent compared to a theoretical nitrogen content of 4.62 percent) by reacting together the N-potassium derivative of 4-cyclohexene-1,2-dicarboximide with O,O-diethyl phosphorochloridothioate.

Bis(1 - methylpropyl)(dichloromaleimido)phosphine oxide (molecular weight of 326.2) by reacting together the N-potassium derivative of phthalimide with O-secondary-butyl O-methyl phosphorochloridothioate.

O-secondary-butyl O-methyl phthalimidophosphonothioate (molecular weight of 313.3) by rearting together the N-potassium derivative of phthalimide with O-secondary-butyl O-methyl phosphorochloridothioate.

O-(2,4,5-trichlorophenyl) phthalimidophosphonamidothioate (molecular weight of 421.6) by reacting together the N-sodium derivative of phthalimide with O-(2,4,5-trichlorophenyl) phosphoramidochloridothioate.

O,O-diethyl phthalimidophosphonate (melting at 65° C.) by reacting together the N-sodium derivative of phthalimide with O,O-diethyl phosphorochloridate.

O-ethyl O-isopropyl (4-cyclohexene-1,2-dicarboximido) phosphonothioate (molecular weight of 317.4) by reacting together the N-sodium derivative of 4-cyclohexene-1,2-dicarboximide with O-ethyl O-isopropyl phosphorochloridothioate.

O - isopropyl n - dodecylsuccinimidophosphinothioate (molecular weight of 390.6) by reacting together the N-sodium derivative of succinimide with O-isopropyl n-dodecylphosphonochloridothioate.

O,O - diethyl (3,4,5,6-tetrachlorophthalimido) - phosphonothioate (melting at 162–165° C. and having an actual phosphorus content of 7.01 compared to a theoretical phosphorus content of 7.10) by reacting together the N-potassium derivative of 3,4,5,6-tetrachlorophthalimide with O,O-diethyl phosphorochloridothioate.

N - ethyl - P - (4-cyclohexene-1,2-dicarboximido)phosphonic diamide (molecular weight of 257.2) by reacting together the N-potassium derivative of 4-cyclohexene-1,2-dicarboximide with N-ethylphosphorodiamidic chloride.

O-ethyl O-n-propyl phthalimidophosphonate (molecular weight of 297.3) by reacting together the N-potassium derivative of phthalimide with O-ethyl O-n-propyl phosphorochloridate.

S-secondary - butyl (3,5-cyclohexadiene-1,2-dicarboximido)phosphonamidodithioate (molecular weight of 316.4) by reacting together the N-sodium derivative of 3,5-cyclohexadiene-1,2-dicarboximide with S-secondary-butyl phosphoramidochloridodithioate.

O-ethyl N,N-dimethyl(3,4,5,6-tetrachlorophthalimido) phosphonamidothioate (melting at 170° C.) by reacting together the N-potassium derivative of 3,4,5,6-tetrachlorophthalimide with O-ethyl N,N-dimethylphosphoramidochloridothioate.

O,O-di-n-decyl (4,5-dichlorophthalimido)phosphonate (molecular weight of 576.6) by reacting together the N-potassium derivative of 4,5-dichlorophthalimide with O,O-di-n-decyl phosphorochloridothioate.

O,O - diethyl (4-cyclohexene-1,2-dicarboximido)phosphonate (molecular weight of 287.3) by reacting together the N-sodium derivative of 4-cyclohexene-1,2-dicarboximide with O,O-diethyl phosphorochloridate.

O - methyl N-isopropylphthalimidophosphonamidothioate (melting at 72–78° C.) by reacting together the N-sodium derivative of phthalimide with O-methyl N-isopropyl phosphoramidochloridothioate.

Methylsuccinimidophosphinic amide (molecular weight of 176.1) by reacting together the N-potassium derivative of succinimide with P-methylphosphonamidic chloride.

O,O - diisopropyl (4 - cyclohexene-1,2-dicarboximido) phosphonate (molecular weight of 315.3) by reacting together the N-potassium derivative of 4-cyclohexene-1,2-dicarboximide with O,O-diisopropyl phosphorochloridate.

O,O-di-n-propyl phthalimidophosphonothioate (melting at 52–53° C. and having an actual nitrogen content of 4.32 percent compared to a theoretical nitrogen content of 4.28 percent) by reacting together the N-potassium derivative of phthalimide with O,O-di-n-propyl phosphorochloridothioate.

O-isobutyl N,N-diethyl(3,6-dimethylphthalimido)phosphonoamidothioate (molecular weight of 382.5) by reacting together the N-sodium derivatives of 3,6-dimethylphthalimide with O-isobutyl N,N-diethylphosphoramidochloridothioate.

O,O - diethyl (4-methylphthalimido)phosphonothioate (melting at 69.5–70° C. and having an actual nitrogen content of 4.44 percent compared to a theoretical nitrogen content of 4.47 percent) by reacting together the N-sodium derivative of 4-methylphthalimide and O,O-diethyl phosphorochloridothioate.

O - (p - tert. - butylphenyl)(5-bromo-m-tolyl)(1-cyclohexene-1,2-dicarboximido)phosphinate (molecular weight of 516.4) by reacting together the N-potassium derivative of 1-cyclohexene-1,2-dicarboximide with O-(p-tert.-butylphenyl)(5-bromo-m-tolyl)phosphonochloridate.

O,O - diethyl (4 - chlorophthalimido)phosphonothioate (melting at 88–91° C.) by reacting together the N-sodium derivative of 4-chlorophthalimide with O,O-diethyl phosphorochloridothioate.

O,O-di-n-dodecyl phthalimidophosphonothioate (molecular weight of 579.8) by reacting together the N-sodium derivative of phthalimide with O,O-di-n-dodecyl phosphorochloridothioate.

O,O-di-n-propyl (4-bromo-5-chlorophthalimido)phosphonate (molecular weight of 424.6) by reacting together the N-potassium derivative of 4-bromo-5-chlorophthalimide with O,O-di-n-propyl phosphorochloridate.

O,O-diisopropyl phthalimidophosphonothioate (melting at 77–81° C. and having an actual nitrogen content of 4.34 percent compared to a theoretical nitrogen content of 4.28 percent) by reacting together the N-sodium derivative of phthalimide with O,O-diisopropyl phosphorochloridothioate.

O,O-dimethyl (4-methylphthalimido)phosphonothioate (molecular weight of 285.3) by reacting together the N-sodium derivative of 4-methylphthalimide with O,O-dimethyl phosphorochloridothioate.

O-ethyl N-isopropyl(4-cyclohexene-1,2-dicarboximido)-phosphonate (molecular weight of 300.0) by reacting together the N-potassium derivative of 4-cyclohexene-1,2-dicarboximide with O-ethyl N-isopropylphosphoramidochloridate.

O,O-diisobutyl phthalimidophosphonothioate (melting at 38–41° C. and having an actual nitrogen content of 3.93 percent compared to a theoretical nitrogen content of 3.94 percent) by reacting together the N-sodium derivative of phthalimide with O,O-diisobutyl phosphorochloridothioate.

N,N' - di - secondary - butyl(4 - cyclohexene - 1,2 - dicarboximido)phosphonothioic diamide (molecular weight of 357.5) by reacting together the N-sodium derivative of 4-cyclohexene-1,2-dicarboximide with N,N'-di-secondary-butyl-phosphorodiamidochloridothioate.

O,O - diethyl (3 - nitrophthalimido)phosphonothioate (melting at 91–92° C.) by reacting together the N-sodium derivative of 3-nitrophthalimide with O,O-diethyl phosphorochloridothioate.

O,O - di - n - pentyl (2-cyclohexene-1,2-dicarboximido) phosphonothioate (molecular weight of 287.5) by reacting together the N-sodium derivative of 2-cyclohexene-1,2 dicarboximide with O,O-di-n-pentyl phosphorochloridothioate.

O,O - diethyl (4 - nitrophthalimido)phosphonothioate (melting at 63–64° C.) by reacting together the N-potassium derivative of 4-nitrophthalimide with O,O-diethyl phosphorochloridothioate.

O-(1-n-propylpentyl) N-methyl(4-cyclohexene-1,2-dicarboximido)phosphonamidothioate (molecular weight of 372.5) by reacting together the N-potassium derivative of 4-cyclohexene-1,2-dicarboximide with O-(1-n-propylpentyl) N-methylphosphoramidochloridothioate.

O,O-diethyl (7 - oxabicyclo(2.2.1)heptane - 2,3 - dicarboximido)phosphonothioate (melting at 64–68° C.) by reacting together the N-sodium derivative of 7-oxabicyclo(2.2.1)heptane - 2,3 - dicarboximide with O,O - diethyl phosphorochloridothioate.

S,S-di-n-heptyl phthalimidophosphonodithioate (molecular weight of 455.6) by reacting together the N-sodium derivative phthalimide with S,S-di-n-heptyl phosphorochloridodithioate.

O,O - diethyl (5 - norbornene - 2,3 - dicarboximido) phosphonothioate (melting at 88–90° C.) by reacting together the N-sodium derivative of 5-norbornene-2,3-dicarboximide with O,O-diethyl phosphorochloridothioate.

S-secondary-butyl S-methyl phthalimidophosphonotrithioate (molecular weight of 345.4) by reacting together the N-potassium derivative of phthalimide with S-secondary-butyl-S-methyl phosphorochloridotrithioate.

O,O-diethyl (4-methoxyphthalimido)phosphonothioate (melting at 89–92° C.) by reacting together the N-potassium derivative of 4-methoxyphthalimide with O,O-diethyl phosphorochloridothioate.

O-methyl O-(3,4,5-trimethylphenyl)(4-cyclohexene-1,2-dicarboximido)phosphonate (molecular weight of 363.4) by reacting together the N-sodium derivative of 4-cyclohexene-1,2-dicarboximide with O-methyl O-(3,4,5-trimethylphenyl)phosphorochloridate.

O,O-diethyl succinimidophosphonothioate (melting at 61.5–62° C.) by reacting together the N-sodium derivative of succinimide with O,O-diethyl phosphorochloridothioate.

Bis(para - chlorophenyl)phthalimidophosphine sulfide (molecular weight of 432.3) by reacting together the N-potassium derivative of phthalimide with bis(para-chlorophenyl)phosphinothioic chloride.

S,S-diethyl phthalimidophosphonotrithioate (melting at 59–59.5° C.) by reacting together the N-sodium derivative of phthalimide with S,S-diethyl phosphorochloridotrithioate.

O-methyl (2-chloro-4-tertiary-butylphenyl)(4-n-butylphthalimido)phosphinothioate (molecular weight of 463.0) by reacting together the N-sodium derivative of 4-n-butylphthalimide with O-methyl (2-chloro-4-tertiarybutylphenyl)phosphonochloridothioate.

O - 2,4 - dichlorophenyl N - isopropylphthalimidophosphonamidothioate (melting at 139–139.5° C.) by reacting together the N-potassium derivative of phthalimide with O-2,4-dichlorophenyl N-isopropylphosphoramidochloridothioate.

O,O - diphenyl (3-ethyl-4-cyclohexene-1,2-dicarboximide)phosphonate (having a molecular weight of 411.4) by reacting together the N-potassium derivative of 3-ethyl-4-cyclohexene-1,2-dicarboximide with O,O-diphenyl phosphorochloridate.

O,O - bis(2-ethylhexyl) phthalimidophosphonothioate (having a refractive index $n$ measured at 25° C. for the D line of the sodium light of 1.5234) by reacting together the N-sodium derivative of phthalimide with O,O-bis(2-ethylhexyl) phosphorochloridothioate.

S,S - di - n - nonyl (4-cyclohexene-1,2-dicarboximido)-phosphonotrithioate (molecular weight of 531.8) by reacting together the N-potassium derivative of 4-cyclohexene-1,2-dicarboximide with S,S-di-n-nonyl phosphorochloridotrithioate.

O,O - dimethyl (4-methyl-4-cyclohexene-1,2-dicarboximido)phosphonothioate (melting at 40–41.5° C.) by reacting together the N-potassium derivative of 4-methyl-4-cyclohexene-1,2-dicarboximide with O,O-dimethyl phosphorochloridothioate.

O,O - diisobutyl (2 - cyclohexene-1,2-dicarboximido)-phosphonothioate (molecular weight of 359.4) by reacting together the N-potassium derivative of 2-cyclohexene-1,2-dicarboximide with O,O-diisobutyl phosphorochloridothioate.

O,O - diethyl (1 - cyclohexene - 1,2 - dicarboximido)-phosphonothioate (melting at 65–66° C.) by reacting together the N-sodium derivative of 1-cyclohexene-1,2-dicarboximide with O,O - diethyl phosphorochloridothioate.

N,N' - dimethyl(3 - cyclohexene-1,2-dicarboximido)-phosphonodiamidothioate (molecular weight of 273.3) by reacting together the N-sodium derivative of 3-cyclohexene-1,2-dicarboximide with N,N'-dimethyl phosphorochloridothioic diamide.

O,O - diethyl (4 - methyl-4-cyclohexene-1,2-dicarboximido)phosphonothioate (an oil having an actual nitrogen content of 4.69 percent compared to a theoretical nitrogen content of 4.42) by reacting together the N-potassium derivative of 4-methyl-4-cyclohexene-1,2-dicarboximide with O,O-diethyl phosphorochloridothioate.

Diphenyl succinimidophosphine oxide (molecular weight of 299.3) by reacting together the N-potassium derivative of succinimide with P,P-diphenylphosphinic chloride.

O,O - diethyl (cyclohexane-1,2-dicarboximido)-phosphonothioate (having an actual nitrogen content of 4.89 compared to a theoretical nitrogen content of 4.60) by reacting together the N-sodium derivative of cyclohexane-1,2-dicarboximide with O,O-diethyl phosphorochloridothioate.

O,O-diethyl dichloromaleimidophosphonothioate (having a refractive index $n$ measured at 25° C. for the D line of sodium light of 1.5260) by reacting together the N-sodium derivative of dichloromaleimide with O,O-diethyl phosphorochloridothioate.

N,N,N',N' - tetramethyl(4 - methyl-4-cyclohexene-1,2-dicarboximido)phosphonothioic diamide (melting at 97–98° C.) by reacting together the N-potassium derivative of 4 - methyl - 4 - cyclohexene-1,2-dicarboximide with N,N,N',N'-tetramethylphosphorodiamidothioic chloride.

S,S - di-n-propyl (norbornane-2,3-dicarboximido)-phosphonodithioate (molecular weight of 361.5) by reacting together the N-sodium derivative of norbornane-2,3-dicarboximide with S,S-di-n-propyl phosphorochloridodithioate.

O,O - diethyl (4-(methoxycarbonyl)phthalimido)-phosphonothioate (having a refractive index $n$ measured at 25° C. for the D line of sodium light of 1.5430) by reacting together the N-sodium derivative of 4-(methoxycarbonyl)phthalimide with O,O-diethyl phosphorochloridothioate.

O,O-diphenyl (5-norbornene-2,3-dicarboximido)-phosphonothioate (molecular weight of 411.4) by reacting together the N-potassium derivative of 5-norbornene-2,3-dicarboximide with O,O - diphenyl phosphorochloridothioate.

O,O - diethyl (x-methyl - 5-norbornene-2,3-dicarboximido)phosphonothioate (having a refractive index $n$ measured at 25° C. for the D line of sodium light of 1.5147) by reacting together the N-potassium derivative of x-methyl-5-norbornene-2,3-dicarboximide with O,O-diethyl phosphorochloridothioate.

O,O-di-ortho-tolyl (7-oxabicyclo(2.2.1)hept-5-ene-2,3-dicarboximido)phosphonate (molecular weight of 425.4) by reacting together the N-sodium derivative of 7-oxabicyclo - (2.2.1)hept-5-ene-2,3-dicarboximide with O,O-di-ortho-tolyl phosphorochloridate.

O,O - diethyl (4 - acetamidophthalimido)phosphonothioate (melting at 138–138.5° C.) by reacting together the N-sodium derivative of 4-acetamidophthalimide with O,O-diethyl phosphorochloridothioate.

O,O-di-n-octyl phthalimidophosphonate (having a density measured at 25° C. when compared with the density of water at 4° C. of 1.0985) by reacting together the N-potassium derivative of phthalimide with O,O-di-n-octyl phosphorochloridate.

O,O-bis(para-bromophenyl) (3-n-propyl-5-cyclohexene-1,2-dicarboximido)phosphonate (molecular weight of 583.2) by reacting together the N-potassium derivative of 3-n-propyl-5-cyclohexene-1,2-dicarboximide with O,O-bis (para-bromophenyl) phosphorochloridate.

O,O-diphenyl phthalimidophosphonothioate (melting at 70–72° C.) by reacting together the N-sodium derivative of phthalimide with O,O-diphenyl phosphorochloridothioate.

O,O-diethyl (5-methoxynorbornane-2,3-dicarboximido) phosphonothioate (molecular weight of 347.4) by reacting together the N-sodium derivative of 5-methoxynorbornane-2,3-dicarboximide with O,O-diethyl phosphorochloridothioate.

O,O - diphenyl (3,4,5,6-tetrachlorophthalimido)-phosphonothioate (melting at 186–188° C.) by reacting together the N-potassium derivative of 3,4,5,6-tetrachlorophthalimide with O,O-diphenyl phosphorochloridothioate.

Diphenylphthalimidophosphine sulfide (melting at 196–197° C.) by reacting together the N-sodium derivative of phthalimide with diphenylphosphinothioic chloride.

S,S-diethyl (4-(n-propoxycarbonyl)cyclohexane-1,2-dicarboximido)phosphonodithioate (molecular weight of 407.5) by reacting together the N-sodium derivative of 4-(n-propoxy carbonyl) cyclohexane-1,2-dicarboximide with S,S-diethyl phosphorochloridodithioate.

Diphenyl (3,4,5,6 - tetrachlorophthalimido)phosphine sulfide (melting at 198–200° C.) by reacting together the N-sodium derivative of 3,4,5,6-tetrachlorophthalimide with diphenyl phosphinothioic chloride.

O,O-diethyl (3-acetamido-5-methylphthalimido)-phosphonothioate (moleculer weight of 370.4) by reacting together the N-potassium derivative of 3-acetamido-5-methylphthalimide with O,O-diethyl phosphorochloridothioate.

In accordance with these inventions, it has been discovered that the present phosphorus compounds are adapted to be employed as parasiticides for the control of a wide variety of insect, mite, helminth, plant, fungal, and bacterial organisms. They are particularly adapted to be employed for the control of a wide range of fungi, especially those fungal organisms ordinarily found on the aerial portions of plants, such as, for example, cherry, leaf spot, apple scab, powdery mildew, Helminthosporium (leaf spot on grasses, cereals, and corn), and tomato late blight. The compounds can also be applied in dormant applications to the woody surfaces of plants or to orchard floor surfaces for the control of the overwintering spores of many fungi. In addition, the phosphorus compounds can be applied to seeds to protect the seeds from the attack of fungal organisms such as rot and mildew. Also, the phosphorus compounds can be distributed in soil at pesticidal or fungicidal concentrations to control the organisms which attack seeds and plant roots, particularly the fungal organisms of root rot and mildew.

In further operations, the compounds can be included in inks, adhesives, soaps, cutting oils, polymeric materials, or in oil or latex paints, to prevent mold, mildrew, and the degradation of such products resulting from microbial attack. Also, the compounds can be distributed in textile or cellulosic materials, or can be employed in the impregnation of wood and lumber to preserve and protect such products from the attack of the microbial agents or rot, mold, mildew and decay. The foregoing environments are merely illustrative of the many habitats in which these agents can be distributed to obtain excellent fungal control.

It is an advantage of the present inventions that compositions containing these compounds can be applied to growing vegetation in amounts required for effective control without significant injury to the plants. It is a further advantage that the compounds of the present inventions have a very low toxicity to mammals, at the rates at which they are employed for the control of fungal organisms. It is another advantage that a single application of the compounds will provide a residual and extended control of fungi over a period of several months. Also, it is an advantage that the phosphorus compounds are effective in eliminating established fungal infestation as well as in providing residual and extended control against fungal attack. Further, the phosphorus compounds have been found to be translocated in plants and thus it is an advantage of the present inventions that the phosphorus compounds provide a systemic protection against the plant attacking organisms. It is still further advantage that the phosphorus compounds can be handled with a minimum of danger from accidental mammalian exposure thereto because their mammalian toxicity is of a very low order of magnitude.

In carrying out the method of the present inventions, the undesirable parasites can be controlled by contacting the organisms and/or their habitats with a parasiticidal amount of one or more of the phosphorus compounds. Where the method is employed for the control of fungal organisms, a fungicidal amount of one or more of the phosphorus compounds is employed. However, the present inventions also embrace the employment of a liquid, powder or dust composition containing one or more of the toxicants. Such compositions are adapted to be applied to the living plants without substantial injury to the plants. In preparing toxicant compositions, the phosphorus compounds can be modified with one or more of a plurality of additaments including organic solvents, petroleum distillates, water or other liquid carriers, surface active dispersing agents, and finely divided inert solids. In such compositions, the phosphorus toxicants oftentimes are present in a concentration from about 2 to 98 percent by weight. Depending upon the concentration in the composition of the phosphorus product, such augmented compositions are adapted to be employed for the control of the undesirable fungi or employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the inventions, and to obtain an improved and outstanding result.

The exact concentration of the phosphorus compound employed in the compositions for application to the parasite organisms and/or their habitats can vary provided a parasiticidal and fungicidal dosage of toxicant is applied either on the organism or its environment. This dosage of toxicant is primarily dependent upon the susceptibility of the particular organism to the particular phosphorus compound employed. In general, good results are obtained with liquid compositioins containing from about 0.0001 to 2.0 percent by weight of toxicant in some operations, however, compositions containing as much as from 2 to 98 percent by weight are conveniently employed, as, for example, in applications to orchard floor surfaces for the control of spores. With dusts, good results are usually obtained with compositions containing from 0.001 to 2.0 percent or more by weight of toxicant. In some circumstances, it is preferred to employ dust compositions containing as much as from 2 to 98 percent or more by weight of toxicant. Where the compositions are to be applied to living plants, it is preferred that the toxicant be present in an amount not to exceed about 0.8 percent in liquid compositions and 1.0 percent in dusts. In terms of acreage application, good controls of parasite and fungal organisms are obtained when the phosphorus compounds are applied to plots of growing plants at a dosage of from 0.004 to 3 or more pounds per acre.

In the protection and preservation of inks, adhesives, cutting oils, paints, textiles and paper, good results are obtained when the compounds are incorporated in such products in the amount of at least 0.0001 percent by weight. In the preservation of wood, exxcellent results are obtained when the compounds are incorporated by conventional treatment in the wood in the amount of at least 0.0001 pound per cubic foot of wood.

In the preparattion of dust compositions, the toxicant products can be compounded with any of the finely divided solids such as pyrophyllite, talc, chalk, gypsum, and the like. In such operations, the finely divided carrier is ground or mixed with the toxicant or wet with a solution of the toxicant in a volatile organic solvent. Similarly, dust compositions containing the products can be compounded with various solid surface-active dispersing agents, such as fuller's earth, bentonite, attapulgite and other clays. Depending upon the proportions of ingredients these dust compositions can be employed for the control of fungi or employed as concentrates and subsequently diluted with an additional solid surface-active dispersing agent or with pyrophyllite, chalk, talc, gypsum, and the like to obtain the desired amount of active ingredient in a composition adapted to be employed for the control of fungi. Also, such dust compositions, when employed as concentrates, can be dispersed in water, with or without the aid of dispersing agents to form spray mixtures.

Further, the phosphorus compounds or a liquid or dust concentrate composition containing such compounds can be incorporated in intimate mixture with surface-active dispersing agents such as ionic and non-ionic emulsifying agents to form spray compositions. Such compositions are readily employed for the control of fungi or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce emulsifiable concentrates which can be further diluted with water and oil to form spray mixtures in the form of oil-in-water emulsions. In such compositions, the carrier comprises an aqueous emulsion, i.e., a mixture of water immiscible solvent, emulsifying agent and water. Preferred dispersing agents which can be employed in these compositions are oil-soluble and include the non-ionic emulsifiers such as the condensation products of alkylene oxides with the inorganic acids, polyoxyethylene derivatives of sorbitan esters, complex ether alcohols and the like. However, oil-soluble ionic emulsifying agents such as mahogany soaps can also be used. Suitable organic liquids which can be employed in the composition include petroleum oils and distillates, toluene, liquid halohydrocarbon and synthetic organic oils. The surface-active dispersing agents are usually employed in liquid compositions in the amount of from 0.1 to 20 percent by weight of the combined weight of the dispersing agent and active compound.

When operating in accordance with the present inventions, the phosphorus compounds or a composition containing the compounds can be applied to the fungal organisms to be controlled, or to their habitats in any convenient fashion, e.g., by means of hand dusters or sprayers. Applications to the above-ground portions of plants conveniently can be carried out with powder dusters, boom sprayers, high-pressure sprayers, and spray dusters. In foliar applications, the employed compositions should not contain any appreciable amount of phytotoxic diluents. In large scale operations, dusts or low volume sprays can be applied from airplanes.

In other operations, the phosphorus compounds can be dispersed in an atmosphere, particularly within a space temporarily or permanently enclosed such as a greenhouse, railroad car, or the like, to control fungal organisms therewithin, to protect contents exposed to the atmosphere, and to control air-borne fungal organisms such as spores and the like. In these operations, a phosphorus compound can be placed upon a surface of which the temperature facilitates volatilization, at a desired rate, of the compound or composition containing the same into the atmosphere; also, in an alternate embodiment, a phosphorus compound can be used as an aerosol; that is, incorporated with a propellant and, if desired, a cosolvent, and the resulting composition released from a pressure container into the atmosphere.

Although the compounds, methods, and compositions of the present inventions are useful for the control of a number of parasites, and in particular, for the control of a number of fungal organisms, such teaching is not to be construed as a teaching that all of the methods, compositions, and compounds are equivalents for the control of a particular parasite or a particular fungal organism.

The following examples further illustrate the present inventions but are not to be construed as limiting in scope.

EXAMPLE 2

50 parts by weight of O,O-diethyl phthalimidophosphonothioate is mixed and ground with 18 parts of diatomaceous earth (Celite 209), 24 parts of a hydrous aluminum silicate (Barden Clay), 6 parts of an alkyl aryl sulfonate (Nacconol NRSF), and 2 parts of a substituted benzoic alkyl sulfonic acid (Daxad No. 27) to prepare a composition which can be used in accordance with the foregoing teachings. In a similar manner, other phosphorus compositions are prepared by employing one of the following in place of the O,O-diethyl phthalimidophosphonothioate;

O-ethyl N,N-dimethylphthalimidophosphonamidothioate.
O,O-diethyl (4-cyclohexene-1,2-dicarboximido)phosphonothioate.
O,O-diethyl (4-bromophthalimido)phosphonothioate.
N,N,N',N'-tetramethylphthalimidophosphonothioic diamide.
O,O-diethyl (4-methylphthalimido)phosphonothioate.
O,O-di-n-propyl phthalimidophosphonothioate.

Also, 90 parts by weight of O,O-diethyl phthalimidophosphonothioate and 10 parts by weight of a sorbitan monolaurate polyoxyethylene derivative (Tween 20) are mixed together to prepare another composition which also can be employed according to the foregoing teachings. In a similar manner, other compositions are prepared by employing one of the following in place of O,O-diethyl phthalimidophosphonothioate;

O,O-diethyl phthalimidophosphonothioate.
O,O-diethyl (3,4,5,6-tetrachlorophthalimido)phosphonothioate.
O-ethyl N,N-dimethyl (3,4,5,6-tetrachlorophthalimido) phosphonamidothioate.
O-methyl N-isopropylphthalimidophosphonamidothioate.
O,O-diethyl (3,4,5,6-tetrachlorophthalimido)phosphonate.
O,O-dimethyl phthalimidophosphonothioate.

In other procedures, aqueous compositions are prepared by mixing and grinding together in a ball mill 0.06 part by weight of one of the phosphorus compounds, 0.06 part of an alkyl aryl sulfonate (Nacconol NR), and 0.06 part of Daxad No. 27, and 200 parts of water. These compositions are adapted to be empolyed for the control of fungi or to be dispersed in water to provide aqueous compositions having desirable wetting properties. The compositions are useful for the distribution of the phosphonate compounds in fungicidal amounts.

EXAMPLE 3

Four parts by weight of O,O-diethyl phthalimidophosphonothioate, 0.08 part of sorbitan trioleate (Span 85) and 0.02 part of a sorbitan monolaurate polyoxyethylene derivative (Tween 80) are dispersed in 40 milliliters of acetone to produce a concentrate composition in the form of a water-dispersible liquid. A portion of this concentrate composition is dispersed in water to produce an aqueous spray composition containing 150 parts of the subject compound per million parts by weight of ultimate mixture. To resultant composition is sprayed with an atomizing spray nozzle using air pressure at 20 pounds per square inch on young tomato plants which are about 4 inches tall. The applications are carried out so as to give thorough coverage of all surfaces of the leaves of the plants without appreciable run-off. Following the applications, the spray compositions are allowed to dry upon the leaf surfaces and the plants then inoculated spraying with a suspension of viable spores of *Phytophthora infestans* (tomato late blight). Untreated tomato plants of the same maturity are similarly inoculated to serve as checks. Immediately following the inoculation, all plants are placed in a moist chamber and maintained at 70° F. under saturated humidity conditions for 24 hours. Thereafter, the plants are set aside under greenhouse conditions for about five days and observed for the development of the lesions of tomato late blight caused by the Phytophthora organisms to determine the percent control of this organism.

Observation about one week following the inoculations show substantially complete controls of *Phytophthora infestans* on the plants sprayed with the composition containing O,O-diethyl phthalimidophosphonothioate. At the time of the observations, the leaves of the untreated check plants are found to be heavily covered with lesions of *Phytophthora infestans*.

EXAMPLE 4

Spray composition each containing an amount of one of the phosphorus compounds and each prepared according to Example 2 were employed for the control of *Erysiphe cichoracearum*, an organism causing powdery mildew on cucumber plants. In such operations, each spray composition was sprayed on cucumber plants through an atomizing nozzle using a pressure of 20 pounds per square inch. The applications were carried out so as to give thorough coverage of all surfaces of the plants. After the spray deposit had dried, the plants were inoculated with spores of *Erysiphe cichoracearum*. Untreated cucumber plants were similarly inoculated to serve as checks. After 14 days in a greenhouse, the plants were observed for the development of powdery mildew. The phosphorus compounds, the rates at which they were employed, and the results of the observations, are set forth in the following table.

| Test Compound | Parts of Test Compound Per Million Parts by Weight of Treating Composition | Percent Control of Powdery Mildew |
|---|---|---|
| O,O-diethyl phthalimidophosphonothioate | 150 | 100 |
| | 75 | 100 |
| | 37 | 100 |
| O-ethyl N,N-dimethylphthalimidophosphonamidothioate | 150 | 90 |
| O,O-diethyl (4-cyclohexene-1,2-dicarboximido)phosphonothioate | 150 | 80 |
| O,O-diethyl (4-bromophthalimido)phosphonothioate | 150 | 100 |
| | 75 | 90 |
| N,N,N′,N′-tetramethylphosphonothioic diamide | 150 | 80 |
| O,O-diethyl (4-methylphthalimido)phosphonothioate | 150 | 100 |
| | 75 | 100 |
| | 37 | 80 |
| O,O-dimethyl phthalimidophosphonothioate | 150 | 100 |
| | 75 | 90 |
| O,O-di-n-propyl phthalimidophosphonothioate | 150 | 100 |
| | 75 | 100 |
| | 37 | 100 |
| | 18 | 100 |

EXAMPLE 5

50 parts by weight of O,O-diethyl phthalimidophosphonothioate were mixed and ground with 18 parts of a diatomaceous earth (Celite 209), 24 parts of a hydrous aluminum silicate (Barden Clay), 6 parts of an alkyl aryl sulfonate (Nacconol NRSF), and 2 parts of a substituted benzoic acid alkyl sulfonic acid (Daxad No. 27) to prepare a concentrate composition in the form of a wettable powder. A portion of this concentrate composition was dispersed in water to produce an aqueous spray composition containing one-half pound of the O,O-diethyl phthalimidophosphonothioate per 100 gallons of the ultimate aqueous spray composition. This composition was applied to trees of an apple orchard for the control of apple scab. The application was carried out with conventional spraying equipment, the spray composition being applied to the trees in an amount sufficient to provide for appreciable run-off. In the treating operations, application of the spray composition was made 5 times over a period of about 10 weeks duration, the first application being made at the pink stage of bloom of the trees. Unsprayed check trees were maintained in the orchard to provide for a continuous source of reinfestation. At about the time of the last spray application, the trees were examined and compared with the untreated check trees to determine what control of apple scab had been obtained. More particularly, the number of inactive and active scab lesions found on 100 representative leaves was determined. Also, the percent of leaves infected with scabs was determined for the treated and untreated trees by examination of a representative number of leaves. The results of the examinations are as presented in the following table.

pound having the formula R'H. Good results are obtained when employing the reactants in amounts which represent equimolecular proportions. When the RH reactant and the R'H reactant are the same chemical compound, good results are obtained when employing two

|  | Total Number of Leaves Examined | Total Number of Leaves Infected | Percent of Leaves Infected With Scab | Number of Scab Lesions on 100 Leaves | | |
|---|---|---|---|---|---|---|
|  |  |  |  | Active | Inactive | Total |
| Trees treated with O,O-diethyl phthalimidophosphonothioate | 1,307 | 19 | 1.41 | .28 | 1.36 | 1.65 |
| Check trees | 1,375 | 430 | 31.31 | 198.35 | 11.22 | 209.5 |

*Example 6*

A portion of the concentrate composition prepared in Example 4 was dispersed in water to prepare an aqueous spray composition containing ¼ pound of the O,O-diethyl phthalimidophosphonothioate compound per 100 gallons of ultimate mixture. This spray composition was employed for the control of the organism causing powdery mildew (*Sphaerotheca pannosa*) on rose plants.

In these operations, the spray composition was applied in successive applications to groups of hybrid tea rose bushes (variety, Crimson Glory) in amounts to give thorough coverage of all surfaces of the leaves of the bushes without appreciable run-off. A total of 11 applications was made, approximately evenly spaced over a period of 3 months of the normal growing season of the rose bushes. Unsprayed check rose bushes were maintained during the 3-month period throughout the area of the treated groups of rose bushes to provide for a continuous source of reinfestation.

Throughout the 3-month period, the groups of treated rose bushes were examined and compared with the untreated check rose bushes to determine what control of powdery mildew had been obtained. In the check group there was found a heavy and persistent infestation of powdery mildew with, as the 3-month period progressed, substantial numbers of yellowed leaves and with considerable defoliation. In the treated groups of rose bushes, there was found a continuous and substantially complete control of powdery mildew; and the bushes in the treated groups were found to be in a healthy and normal state of growth and bloom, with the bushes essentially free from yellowing and defoliation.

The N-alkali metal derivative of a cyclic dicarboximido compound, which derivative is employed as a starting material in the preparation of the compounds of the present inventions, is prepared by known procedures. For example, a cyclic dicarboximido compound of the formula H—R" is reacted with an alkali metal hydroxide, and the alkali metal derivative of the dicarboximido compound separated from the reaction mixture, or, alternatively, the water by-product removed from the reaction mixture and the alkali metal derivative of the dicarboximido compound employed in situ.

The phosphoric or phosphorothioic chloride compounds employed as starting products in the preparation of the compounds of the present inventions are prepared by known procedures. For example, when each of R and R' in the starting product represents amino, loweralkylamino, alkoxy, alkylthio, phenoxy, or substituted phenoxy, a phosphoric or phosphorothioic trichloride corresponding to the formula:

is reacted successfully in either order or simultaneously with a compound having the formula RH and with a commolecular proportions of such compound and one molecular proportion of phosphoric or phosphorothioic trichloride.

The reaction is carried out in the presence of an acid binding agent such as, for example, an organic tertiary amine compound. Conveniently the reaction is carried out in an inert organic liquid as reaction medium such as, for example, diethyl ether, benzene, carbon tetrachloride or methylene chloride.

In those starting products wherein each of R and R' represents alkyl, an alkylmagnesium bromide of the formula.

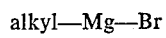

is reacted with phosphorothioic trichloride of the formula

conveniently in an inert organic liquid as reaction medium and at temperatures between 5 and 25° C., to prepare an intermediate of the formula

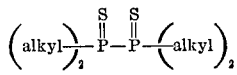

The intermediate is thereafter reacted with chlorine, conveniently at room temperature, and in the presence of inert reaction medium such as carbon tetrachloride, to prepare the desired starting product of the formula

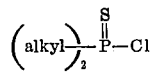

When it is desired to prepare starting products of the formula

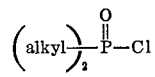

the corresponding product which is identical except that the double-bonded chalkogen is sulfur, or the intermediate employed in the preparation of such corresponding product, is reacted with sulfuryl chloride ($SO_2Cl_2$) at temperatures of about 30–35° C. in inert liquid reaction medium, such as benzene. After the reaction has been completed, the reaction mixture is filtered to remove sulfur by-product, and the filtrate fractionated to remove $SOCl_2$ by-product and to obtain starting product of the formula

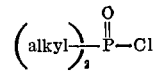

In similar manner are prepared the starting products of the present invention wherein one of R and R' represents alkyl and the other represents phenyl or substituted phenyl. Thus, compound of the formula

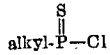

is reacted with an aryl magnesium compound of the formula

Ar—Mg—Br wherein Ar represents phenyl or substituted phenyl, to prepare intermediate of the formula

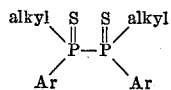

The intermediate is treated with chlorine in inert reaction medium such as carbon tetrachloride to obtain starting product of the formula

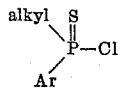

This product can be treated with sulfuryl chloride in the procedures hereinbefore discussed to prepare the corresponding

≡P=O compound.

In the preparation of those starting products wherein each of R and R' represents phenyl or substituted phenyl, an aromatic compound of the formula Ar—H where Ar represents phenyl or substituted phenyl, is reacted with aluminum chloride and phosphorous trichloride (PCl₃) at temperatures of from 50° to 280° to prepare a di-arylphosphorous chloride product of the formula Ar₂PCl and HCl by-product. Good results are obtained when employing the reactants in amounts which represent one molecular proportion of aromatic compound, 1.3 molecular proportions of aluminum chloride, and 4 molecular proportions of phosphorous trichloride. The HCl is separated in conventional procedures and the diarylphosphorus chloride reacted with an excess of oxygen or PSCl₃ at temperatures of from 50 to 150° C. to prepare the desired starting product of the formula

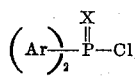

Starting product wherein one of the R and R' represents alkyl, phenyl, or substituted phenyl, and the other represents amino, loweralkylamino, alkoxy, alkylthio, phenoxy, or substituted phenoxy, are prepared by reacting a hydrocarbylphosphorus dichloride product of the formula

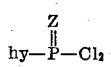

wherein the symbol "hy" represents alkyl, phenyl, or substituted phenyl, with a compound of the formula

R'''H where R''' represents amino, loweralkylamino, alkoxy, alkylthio, phenoxy or substituted phenoxy. The reaction is carried out in the presence of an inert liquid reaction medium, and in the presence of a hydrogen chloride acceptor, such as an organic tertiary amine. Good results are obtained when employing equimolecular proportions of hydrocarbylphosphorus dichloride product, R'''H compound, and hydrogen halide acceptor. The raw materials required for the preparation of starting products, which raw materials have the formulae

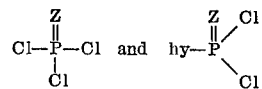

are conveniently available or can be manufactured as described by J. R. Van Wazer in "Phosphorus and its Compounds," Volume I, pages 245 and 258 (1958, Interscience Publishers, New York, New York) and by K. Sasse in "Methoden der Organischen Chemie," Volume XII—Part I, "Organische Phosphorverbindungen," pages 387–406, 552–557 (1963; Thieme Verlag, Stuttgart, Germany).

The present application is directed to and concerned with the disclosure and claiming of the inventions as described hereinbefore. The present application is also directed to the disclosure and claiming of the inventions in compounds, methods, or compositions, comprising or employing any subgeneric group or class of phosphorus compounds which may be obtained by any permutation or combination of the alternative expressions in the several compound definitions to be found hereinbefore.

We claim:

1. The method which comprises applying to fungal organisms and their habitats a fungicidal amount of a phosphorus compound of the formula:

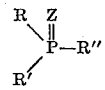

wherein Z represents a member selected from the group consisting of oxygen and sulfur; each R independently represents a member selected from the group consisting of lower alkylamino, alkoxy, alkylthio, alkyl, phenyl, substituted phenyl, phenoxy, and substituted phenoxy, each of the substituted phenyl and substituted phenoxy radicals being independently substituted by from 1 to 3, both inclusive, substituents, each of which substituents is independently selected from the group consisting of halo and loweralkyl; R' represents a member selected from the group consisting of R and amino; and R'' represents a cyclic dicarboximido radical selected from the group consisting of (1) succinimido; (2) dichloromaleimido; (3) cyclic hydrocarbon ortho-dicarboximido selected from the group consisting of phthalimido; partially-saturated phthalimido; cyclohexane-1,2-dicarboximido; norborane-2,3-dicarboximido; 5-norbornene-2,3-dicarboximido; 7-oxabicyclo(2.2.1)heptane-2,3-dicarboximido; and 7-oxabicyclo(2.2.1)hept-5-ene-2,3-dicarboximido; and (4) cyclic hydrocarbon ortho-dicarboximido defined as in (3) but bearing one or more substituent moieties selected from the group consisting of halo, nitro, loweralkyl, methoxy, loweralkoxycarbonyl, and acetamido, there being, when every substituent is halo, from 1 to 4, both inclusive, such substituents, and there being, when one substituent is nitro, loweralkyl, methoxy, loweralkoxycarbonyl, or acetamido, from 1 to 2, both inclusive, total substituents.

2. The method according to claim 1 wherein said phosphorus compound is employed in the form of a composition comprising said compound in intimate admixture with a parasiticide adjuvant as a carrier thereof.

3. The fungicidal composition comprising a phosphorus compound in intimate mixture with from 0.1 to 20 percent by weight of a surface-active dispersing agent, said phosphorus compound being of the formula:

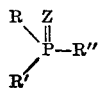

wherein Z represents a member selected from the group consisting of oxygen and sulfur; each R independently represents a member selected from the group consisting of loweralkylamino, alkoxy, alkylthio, alkyl, phenyl, substituted phenyl, phenoxy, and substituted phenoxy, each of the substituted phenyl and substituted phenoxy radicals being independently substituted by from 1 to 3, both inclusive, substituents, each of which substituents is independently selected from the group consisting of halo and loweralkyl; R' represents a member selected from the group consisting of R and amino; and R" represents a cyclic dicarboximido radical selected from the group consisting of (1) succinimido; (2) dichloromaleimido; (3) cyclic hydrocarbon ortho-dicarboximido selected from the group consisting of phthalimido; partially-saturated phthalimido; cyclohexane-1,2-dicarboximido; norbornane-2,3-dicarboximido; 5-norbornene-2,3-dicarboximido; 7-oxabicyclo(2.2.1)heptane-2,3-dicarboximido; and 7-oxabicyclo(2.2.1)hept-5-ene-2,3-dicarboximido; and (4) cyclic hydrocarbon ortho-dicarboximido defined as in (3) but bearing one or more substituent moieties selected from the group consisting of halo, nitro, loweralkyl, methoxy, loweralkoxycarbonyl, and acetamido, there being, when every substituent is halo, from 1 to 4, both inclusive, such substituents, and there being, when one substituent is nitro, loweralkyl, methoxy, loweralkoxycarbonyl, or acetamido, from 1 to 2, both inclusive, total substituents.

4. An aqueous dispersion of the composition of claim 3 wherein the phosphorus compound is present in such composition in an amount of at least 0.0001 percent by weight.

5. The fungicidal composition comprising from 2 to 98 percent by weight of a phosphorus compound in intimate admixture with a finely divided inert solid, said phosphorus compound being of the formula

wherein Z represents a member selected from the group consisting of oxygen and sulfur; each R indepently represents a member selected from the group consisting of loweralkylamino, alkoxy, alkylthio, alkyl, phenyl, substituted phenyl, phenoxy, and substituted phenoxy, each of the substituted phenyl and substituted phenoxy radicals being independently substituted by from 1 to 3, both inclusive, substituents, each of which substituents is independently selected from the group consisting of halo and loweralkyl; R' represents a member selected from the group consisting of R and amino; and R" represents a cyclic dicarboximido radical selected from the group consisting of (1) succinimido; (2) dichloromaleimido; (3) cyclic hydrocarbon ortho-dicarboximido selected from the group consisting of phthalimido; partially-saturated phthalimido; cyclohexane-1,2-dicarboximido; norbornane-2,3-dicarboximido; 5-norbornene-2,3-dicarboximido; 7-oxabicyclo(2.2.1)heptane-2,3-dicarboximido; and 7-oxabicyclo(2.2.1)hept-5-ene-2,3-dicarboximido; and (4) cyclic hydrocarbon ortho-dicarboximido defined as in (3) but bearing one or more substituent moieties selected from the group consisting of halo, nitro, loweralkyl, methoxy, loweralkoxycarbonyl, and acetamido, there being, when every substituent is halo, from 1 to 4, both inclusive, such substituents, and there being, when one substituent is nitro, loweralkyl, methoxy, loweralkoxycarbonyl, or acetamido, from 1 to 2, both inclusive, total substituents.

6. The method of claim 1 wherein the phosphorus compound is O,O-diethyl phthalimidophosphonothioate.

7. The method of claim 1 wherein the phosphorus compound is O,O-di-n-propyl phthalimidophosphonothioate.

8. The method of claim 1 wherein the phosphorus compound is O,O-diethyl (4-methylphthalimido)phosphonothioate.

9. The method of claim 1 wherein the phosphorus compound is O-ethyl N,N-dimethylphthalimidophosphonamidothioate.

10. The method of claim 1 wherein the phosphorus compound is O,O-dimethyl phthalimidophosphonothioate.

11. The method of claim 1 wherein the phosphorus compound is S,S-diethyl phthalimidophosphonotrithioate.

12. The composition of claim 3 wherein the phosphorus compound is O,O-diethyl phthalimidophosphonothioate.

13. The composition of claim 3 wherein the phosphorus compound is O,O-di-n-propyl phthalimidophosphonothioate.

14. The composition of claim 3 wherein the phosphorus compound is O,O-diethyl (4-methylphthalimido)phosphonothioate.

15. The composition of claim 3 wherein the phosphorus compound is O-ethyl N,N-dimethylphthalimidophosphonamidothioate.

16. The composition of claim 3 wherein the phosphorus compound is O,O-dimethyl phthalimidophosphonothioate.

17. The composition of claim 3 wherein the phosphorus compound is S,S-diethyl phthalimidophosphonotrithioate.

18. The composition of claim 5 wherein the phosphorus compound is O,O-diethyl phthalimidophosphonothioate.

19. The composition of claim 5 wherein the phosphorus compound is O,O-di-n-propyl phthalimidophosphonothioate.

20. The composition of claim 5 wherein the phosphorus compound is O,O-diethyl (4-methylphthalimido)phosphonothiate.

21. The composition of claim 5 wherein the phosphorus compound is O-ethyl N,N-dimethylphthalimidophosphonamidothioate.

22. The composition of claim 5 wherein the phosphorus compound is O,O-dimethyl phthalimidophosphonothioate.

23. The composition of claim 5 wherein the phosphorus compound is S,S-diethyl phthalimidophosphonotrithioate.

References Cited

UNITED STATES PATENTS

| | | | |
|---|---|---|---|
| 2,447,715 | 8/1948 | Rose | 260—326 |
| 2,767,194 | 10/1956 | Fancher | 260—326 |
| 2,904,554 | 9/1959 | Wheeler et al. | 260—326 |
| 2,994,637 | 8/1961 | Bimber | 167—30 |
| 2,995,568 | 8/1961 | Leverkusen et al. | 260—326 |
| 3,012,935 | 12/1961 | Goodhue | 167—30 |
| 3,044,981 | 7/1962 | Malz et al. | 260—326 |

FOREIGN PATENTS 906,982    9/1962    Great Britain.

OTHER REFERENCES

Chem. Abst., vol. 60, p. 560f (1964).

ALBERT T. MEYERS, *Primary Examiner.*

JULIAN S. LEVITT, *Examiner.*

GEORGE A. MENTIS, *Assistant Examiner.*